(12) United States Patent
Peng et al.

(10) Patent No.: US 12,417,010 B2
(45) Date of Patent: Sep. 16, 2025

(54) METHOD, APPARATUS, ELECTRONIC DEVICE AND STORAGE MEDIUM FOR INTERACTION

(71) Applicant: Beijing Zitiao Network Technology Co., Ltd., Beijing (CN)

(72) Inventors: Cong Peng, Beijing (CN); Wenshu Zhang, Beijing (CN); Yao Guo, Beijing (CN); Mengting Xie, Beijing (CN); Han Xu, Beijing (CN); Ziyang Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/823,540

(22) Filed: Sep. 3, 2024

(65) Prior Publication Data

US 2024/0427483 A1    Dec. 26, 2024

Related U.S. Application Data

(63) Continuation of application No. PCT/CN2023/106507, filed on Jul. 10, 2023.

(30) Foreign Application Priority Data

Jul. 15, 2022    (CN) .......................... 202210837480.1

(51) Int. Cl.
*G06F 3/04847* (2022.01)
(52) U.S. Cl.
CPC ............................. *G06F 3/04847* (2013.01)

(58) Field of Classification Search
CPC .................................................. G06F 3/04847
See application file for complete search history.

(56) References Cited

U.S. PATENT DOCUMENTS

| | | | | |
|---|---|---|---|---|
| 2010/0095240 | A1* | 4/2010 | Shiplacoff | G06F 3/0481 345/157 |
| 2011/0175930 | A1* | 7/2011 | Hwang | G06F 3/04886 345/660 |
| 2013/0321340 | A1* | 12/2013 | Seo | G06F 3/1438 345/174 |
| 2015/0077436 | A1* | 3/2015 | Ikeda | H04N 1/00442 345/660 |

(Continued)

FOREIGN PATENT DOCUMENTS

| | | |
|---|---|---|
| CN | 111143739 A | 5/2020 |
| CN | 111752440 A | 10/2020 |

(Continued)

OTHER PUBLICATIONS

International Search Report for PCT/CN2023/106507, mailed Oct. 27, 2023, 5 pages.

(Continued)

*Primary Examiner* — Seth A Silverman
(74) *Attorney, Agent, or Firm* — Astute IP Law Group

(57) ABSTRACT

A method, apparatus, electronic device and storage medium for interaction is provided, and the method includes: displaying a topview page, and displaying a first media content on the topview page; and in response to a first slide operation acting within the topview page, switching the currently displayed first media content to a second media content.

20 Claims, 5 Drawing Sheets

S110
DISPLAY A TOPVIEW PAGE, AND DISPLAY A FIRST MEDIA CONTENT ON THE TOPVIEW PAGE

S120
IN RESPONSE TO A FIRST SLIDE OPERATION ACTING WITHIN THE TOPVIEW PAGE, SWITCH THE CURRENTLY DISPLAYED FIRST MEDIA CONTENT TO A SECOND MEDIA CONTENT

(56) References Cited

U.S. PATENT DOCUMENTS

| | | | | |
|---|---|---|---|---|
| 2015/0095785 A1* | 4/2015 | Edge | .................... | G11B 27/034 |
| | | | | 715/731 |
| 2015/0324112 A1* | 11/2015 | Xiong | ................... | G06F 3/0482 |
| | | | | 715/773 |
| 2015/0370402 A1* | 12/2015 | Checkley | .............. | G06F 3/0487 |
| | | | | 345/173 |
| 2017/0329484 A1* | 11/2017 | Huang | .................. | G06F 3/0488 |
| 2018/0082340 A1 | 3/2018 | Freund et al. | | |
| 2022/0050562 A1* | 2/2022 | Su | ......................... | G06F 3/0483 |

FOREIGN PATENT DOCUMENTS

| | | | |
|---|---|---|---|
| CN | 112035195 | A | 12/2020 |
| CN | 112153454 | A | 12/2020 |
| CN | 112783591 | A | 5/2021 |
| CN | 112883212 | A | 6/2021 |
| CN | 112929709 | A | 6/2021 |
| CN | 113760150 | A | 12/2021 |
| CN | 114116053 | A | 3/2022 |
| CN | 114153535 | A | 3/2022 |
| CN | 114327214 | A | 4/2022 |
| CN | 114629882 | A | 6/2022 |
| CN | 115113790 | A | 9/2022 |

OTHER PUBLICATIONS

Office Action for Chinese Patent Application No. 202210837480.1, mailed Apr. 16, 2024, 22 pages.

Office Action for Chinese Patent Application No. 202210837480.1, mailed Oct. 30, 2023, 23 pages.

\* cited by examiner

METHOD, APPARATUS, ELECTRONIC DEVICE AND STORAGE MEDIUM FOR INTERACTION

CROSS-REFERENCE

This application is a continuation of International Application No. PCT/CN2023/106507, filed on Jul. 10, 2023, which claims priority to Chinese Patent Application No. 202210837480.1, filed on Jul. 15, 2022, both of which are incorporated here by reference in its entirety.

FIELD

The present disclosure relates to the field of computer technologies, and in particular, to a method, an apparatus, an electronic device, and storage medium for interaction.

BACKGROUND

With the development of science and technology, a variety of applications have emerged, such as video-type applications.

When launching a video-type application, a topview page is displayed, and a corresponding topview content is displayed on the topview page; then the video stream page is displayed. However, the interaction of the page in such a solution is cumbersome, which leads to poor user experience of the application.

SUMMARY

The specification provides a method, an apparatus, an electronic device and storage medium for interaction, to improve the convenience of interaction operations and enhance the user interaction experience.

In a first aspect, the embodiments of the present disclosure provide a method of interaction, including:
  displaying a topview page, and displaying a first media content on the topview page; and
  in response to a first slide operation acting within the topview page, switching the currently displayed first media content to a second media content.

In a second aspect, the embodiments of the present disclosure further provide an apparatus for interaction, including:
  a display module configured to display a topview page, and display a first media content on the topview page; and
  a response module configured to, in response to a first slide operation acting within the topview page, switch the currently displayed first media content to a second media content.

In a third aspect, the embodiments of the present disclosure further provide an electronic device, including:
  one or more processors;
  a memory configured to store one or more programs,
  the one or more programs, when executed by the one or more processors, causing the one or more processors to implement the method of interaction according to the embodiments of the present disclosure.

In a fourth aspect, the embodiments of the present disclosure further provide a computer-readable storage medium, wherein the computer-readable storage medium has a computer program stored thereon, and the computer program, when executed by a processor, implements the method of interaction according to the embodiments of the present disclosure.

DETAILED DESCRIPTION

Figure 1:
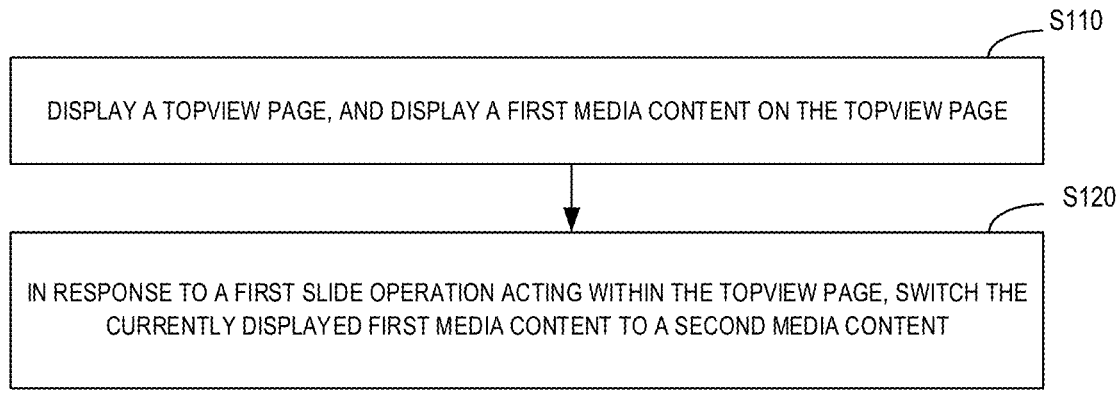
FIG. 1 is a schematic flowchart of a method of interaction according to an embodiment of the present disclosure.

Embodiments of the present disclosure will be described below with reference to the accompanying drawings. While some embodiments of the present disclosure are shown in the drawings, the present disclosure may be implemented in a variety of forms and should not be construed as limited to the embodiments set forth herein, but rather these embodiments are provided to understand the present disclosure. The drawings and embodiments of the present disclosure are for example purposes only and are not intended to limit the scope of the present disclosure.

The plurality of steps documented in the method embodiments of the present disclosure may be performed in a different order, and/or in parallel. Furthermore, the method embodiments may include additional steps and/or omit performing the illustrated steps. The scope of the present disclosure is not limited in this regard.

The term "including" and variations thereof, as used herein, is open-ended, i.e., "including but not limited to." The term "based on" is "based at least in part on." The term "one embodiment" means "at least one embodiment"; the term "another embodiment" means "at least one additional embodiment"; and the term "some embodiments" means "at least some embodiments". Definitions of other terms will be given in the following description.

The concepts of "first", "second" and the like mentioned in the present disclosure are only used to distinguish different apparatuses, modules or units, and are not intended to limit the order or interdependence of the functions performed by these apparatuses, modules or units.

The modifications of "one" and "more than one" mentioned in the present disclosure are schematic and not restrictive and should be understood as "one or more" unless otherwise indicated in the context.

The names of the messages or information interacting between the plurality of apparatuses of the presently disclosed embodiments are used for illustrative purposes only and are not intended to place limitations on the scope of those messages or information.

FIG. 1 is a schematic flowchart of a method of interaction according to an embodiment of the present disclosure.

In a video-type application, in a presentation order, a topview page is displayed first and then a video stream page is displayed. When an interaction operation (such as sliding or clicking) is performed on the topview page, a detail page of an object (for example, a commodity) recommended by the topview content presented on the topview page is switched, and if the display of the topview content is skipped, it is necessary to trigger a skip control displayed on the topview page to switch to the video stream page, and then watch the video on the video stream page. Therefore, a user who opens a video-type application needs to "passively" watch the topview content first or skip the topview content by triggering the skip control displayed in a set position on the topview page, which is inconvenient and affects the user's experience.

Based on this, a method of interaction provided in an embodiment of the present disclosure includes the following steps.

At S110, a topview page is displayed, and a first media content on the topview page is displayed.

The topview page may be considered as a page displayed when an application is launched; the first media content may refer to a content of a recommended target object, such as an advertisement content of a target object predetermined by a developer or a content of a target object recommended according to user needs; the first media content may be in a form of a picture, for example, a static picture or a dynamic picture, or may be a video; the target object is an object to be recommended, for example, may be an item (for example, a virtual item or a non-virtual item) or real-time news.

In this embodiment, the topview page may be displayed, for example, the topview page is displayed when the application is launched, and the first media content is displayed on the topview page, wherein the display duration of the topview page and/or the first media content is not limited and may be predetermined by a relevant personnel.

At S120, in response to a first slide operation acting within the topview page, the currently displayed first media content is switched to a second media content.

The first slide operation may be an act of performing a slide operation within the topview page for switching the currently displayed content, and the slide direction and shape of the first slide operation are not limited, as long as the slide operation can be detected within the topview page. Optionally, the first slide operation may be an operation of sliding along a predetermined direction, such as an operation of sliding upward on the topview page. The content of the second media content is distinguished from the first media content, i.e., the second media content and the first media content may be different media content, for example, the second media content is mainly a video presentation-type of content. Optionally, when the first media content is an advertisement-type content, the second media content may be a non-advertisement-type content, such as an ordinary video.

By way of example, when a user is detected performing a first slide operation within the topview page, such as when a user is detected sliding upward within the topview page, a response may be made to the first slide operation acting within the topview page to switch the currently displayed first media content to the second media content. Herein, the means of switching is not limited herein, such as a means by which the currently displayed first media content may be switched within the topview page to the second media content and may also switch the topview page to a further page and display the second media content in the other page. The other page may refer to a page different from the topview page, such as a predetermined media content display page, etc., and the present embodiment does not limit this.

The method of interaction provided by the embodiment of the specification comprises the following steps: displaying a topview page and displaying a first media content on the topview page; and in response to a first slide operation acting within the topview page, switching the currently displayed first media content to a second media content. The method enables the user to directly switch the currently displayed first media content to the second media content by performing a first slide operation within the topview page, without the need to set a skip control on the topview page or trigger the skip control displayed at a specific location on the topview page, which can reduce the difficulty of operation of the user when skipping the first media content displayed on the topview page, making the interaction operation more convenient, thus improving the user interaction experience.

In an embodiment, the switching the currently displayed first media content to a second media content comprises:
  switching a current media content on the topview page from the first media content to the second media content.

The predetermined media content display page may be understood as a predetermined page configured to display a second media content. For example, a media content in a media content stream corresponding to the second media content. Correspondingly, the second media content may be a media content in the media content stream, i.e., the second media content is located within the media content stream. In addition, the first media content may or may not be located within the media content stream corresponding to the predetermined media content display page.

In this step, when the currently displayed first media content is switched to the second media content, the current page may be switched from the topview page to a predetermined media content display page, and the second media content is displayed in the predetermined media content display page. Herein, the form of switching the current page from the topview page to the predetermined media content display page is not limited, for example, a switch can be performed in slow motion to represent a switch to the current page.

In an embodiment, the method further comprises: after the switching the currently displayed first media content to a second media content,
  in response to a third slide operation acting within the predetermined media content display page, switching a current media content displayed on the predetermined media content display page from the second media content to the first media content; or
  in response to a fourth slide operation acting within the predetermined media content display page, switching a current page from the predetermined media content display page to the topview page, and displaying the first media content on the topview page.

The third slide operation and the fourth slide operation may refer to a behavior of performing a slide operation within the predetermined media content display page, to reswitch the currently displayed media content to the first media content. The third slide operation and the fourth slide operation act within a different page from the first slide operation. The third slide operation and the fourth slide operation may be the same or different slide operations, for example, different slide operations, for example, the first slide operation may be an upward slide operation, and the third slide operation/fourth slide operation may be a downward slide operation. The manner (e.g., direction or path) of the operation of the third slide operation and the fourth slide operation may be the same or different.

After switching the currently displayed first media content to the second media content, the user may perform a third slide operation within the predetermined media content display page to review the first media content. Therefore, when receiving the third slide operation of the user, the application may directly switch the current media content displayed in the predetermined media content display page from the second media content to the first media content. In addition, when the second media content is switched to the first media content, the interaction control and/or the information of the first media content may be displayed in the predetermined media content display page, or the detail control may be displayed in a first position of the predetermined media content display page with a first style. Herein, the interaction control may be a control configured to trigger an execution of an interaction event, for example, a like control, a comment control, or a sharing control of the first media content. By way of example, an interaction control for the first media content may be configured to trigger an execution of an interaction event associated with the first media content, such as liking the first media content, displaying a comment panel of the first media content for the user to comment on the first media content, or displaying a sharing panel of the first media content for the user to share the first media content, etc.; the information of the first media content may include, for example, the user name of the publisher of the first media content and/or the introduction information of the first media content, etc.; the detail control is configured to trigger a display of a detail page of the target object recommended by the first media content; the first style and the first position may be set by the relevant personnel in accordance with the actual situation, and are not limited herein.

Alternatively, after switching the currently displayed first media content to the second media content, the user may perform a fourth slide operation in the predetermined media content display page to review the first media content on the topview page. Therefore, when receiving the fourth slide operation of the user, the application may switch the current page from the predetermined media content display page to the topview page and display the first media content on the topview page. In addition, when the first media content is redisplayed on the topview page, the interaction control and/or information of the first media content may be displayed on the topview page, and the detail control is displayed in the first position with the first style; or the interaction control and/or information of the first media content may not be displayed on the topview page, and the detail control is displayed in a second position with a second style. The specific situation may be determined according to the actual interaction situation, for example, if the duration of the interval between the reception of the fourth slide operation and the initial display of the topview page by the application at this launch (e.g., a start display moment of the topview page at the time of the initial display of the topview page) is less than or equal to the predetermined duration (e.g., 3 s or 5 s, etc.), then an interaction control and/or information of the first media content may be displayed without the first media content on the topview page, and the detail control is displayed in the second position of the topview page with the second style; if the duration of the interval between the reception of the fourth slide operation and the initial display of the topview page by the application at this launch is greater than the predetermined duration, the interaction control and/or information of the first media content may be displayed on the topview page, and the detail control is displayed in the first position of the topview page with the first style. Herein, the second pattern may be different from the first pattern, and the second position may be distinguished from the first position, and the present embodiments do not limit this.

Figure 2:
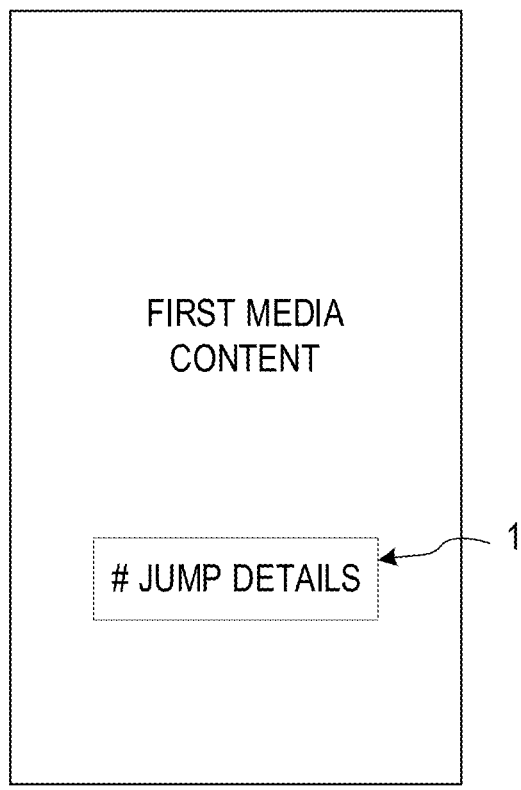
FIG. 2 is a schematic diagram of a topview page according to an embodiment of the present disclosure.

FIG. 2 is a schematic diagram of a topview page provided by an embodiment of the present disclosure. As shown in FIG. 2, the first media content is displayed on the topview page, at which time Detail Control 1 can be displayed in a first position on the topview page with a first style within the topview page.

Figure 3:
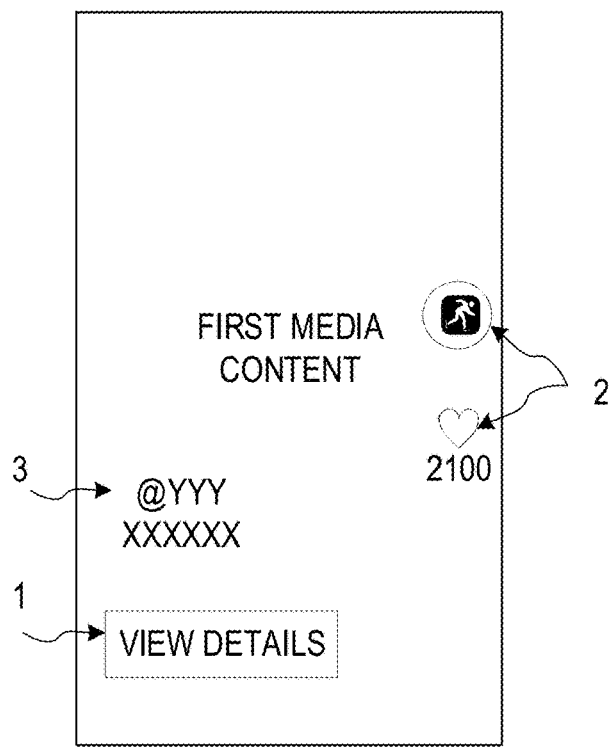
FIG. 3 is a schematic diagram of another topview page according to an embodiment of the present disclosure.

FIG. 3 is a schematic diagram of another topview page provided by an embodiment of the present disclosure. As shown in FIG. 3, the first media content is displayed on the topview page, at which time Interaction Controls 2 and Information 3 of the first media content may also be displayed within the topview page, and Detail Control 1 may be displayed in a second position on the topview page with a second style.

Figure 4:
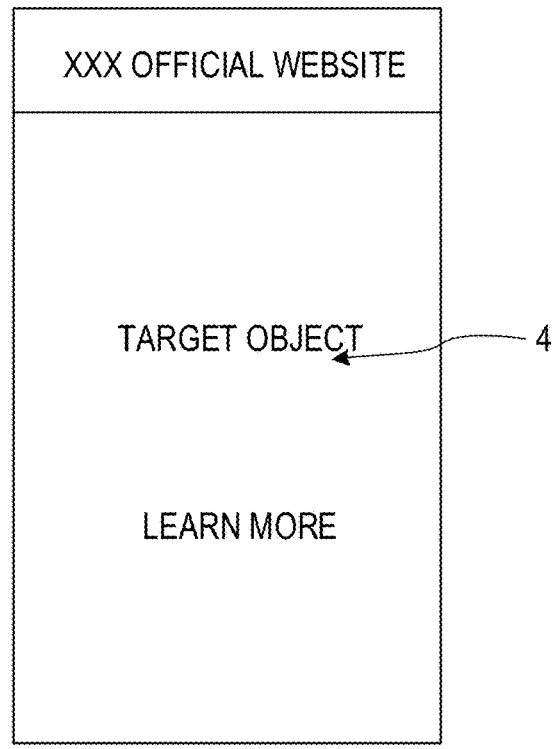
FIG. 4 is a schematic diagram of a detail page according to an embodiment of the present disclosure.

FIG. 4 is a schematic diagram of a detail page provided by an embodiment of the present disclosure. As shown in FIG. 4, when a user is detected to trigger a detail control (such as Detail Control 1 in FIG. 2 or FIG. 3), a detail page of Target Object 4 can be displayed. The detail page may display Target Object 4 as well as the detail information of Target Object 4.

As can be seen, the method of interaction of the present embodiment incorporates a non-blocking interaction framework between the topview page and the video stream page (i.e., the preset media content display page), wherein the user can skip the advertisement to watch the media content in the video stream page by a slide operation (i.e., by a first slide operation within the topview page, the currently displayed topview page is switched to the predetermined media content display page, and the currently displayed first media content is switched to the second media content). At the same time, the user may also return to viewing the advertisement by a slide operation while viewing the media content in the video stream (i.e., by a third slide operation or a fourth slide operation within the predetermined media content display page to switch the displayed predetermined media content display page to the topview page, and to switch the current media content from the second media content to said first media content).

In an implementation, the method of interaction in this embodiment supports different types of topview content, and the different types of topview content may include, for example, a first type of topview content (for example, 3-5 s advertisement material with only a topview stage), and a second type of topview content (for example, 5-60 s long video advertisement material, with both a topview stage and an ordinary video stream style stage).

For the first type of topview content, the method of interaction in this embodiment may automatically switch to play other media content after the 3-5 s advertisement material is played. At this time, the user may or may not review the advertisement through the slide operation. If within the 3-5 s time of playing the advertising material, the user may review the advertisement through the slide operation. In this case, when the user rewatches the advertisement, the "topview style" may be used to display the topview advertisement. The "topview style" may be, for example, that when the topview advertisement is played, the interaction control for the topview advertisement and the information of the topview advertisement are not presented, and a second style is used to display the detail control at the second position on the topview page.

For the second type of topview content, it can be divided into a topview stage (e.g., the duration of the initial display of the topview page from the current launch of the application is less than or equal to the predetermined duration) and an ordinary video stream stage (e.g., the duration of the initial display of the topview page from the current launch of the application is longer than the predetermined duration). The method of interaction of the present embodiment can automatically switch the first media content to an "ordinary video stream style" at the end of the topview stage (e.g., when the time to the initial display of the topview page of the current launch of the application reaches a predetermined time). If the user completes the interaction of sliding away and sliding back to watch the topview advertisement within the above predetermined time, the "topview style" can still be used to present the topview advertisement when the user slides back to watch the topview advertisement; if the interaction of the user sliding back to watch the topview advertisement exceeds the above predetermined time, the topview advertisement can be presented in an "ordinary video stream style" when the user slides back to watch the topview advertisement again. The "ordinary video stream style" may be, for example, to present the interaction control for the topview advertisement and the information of the topview advertisement when the topview advertisement is played, and to display the detail control at the first position of the topview page in the first style.

Figure 5:
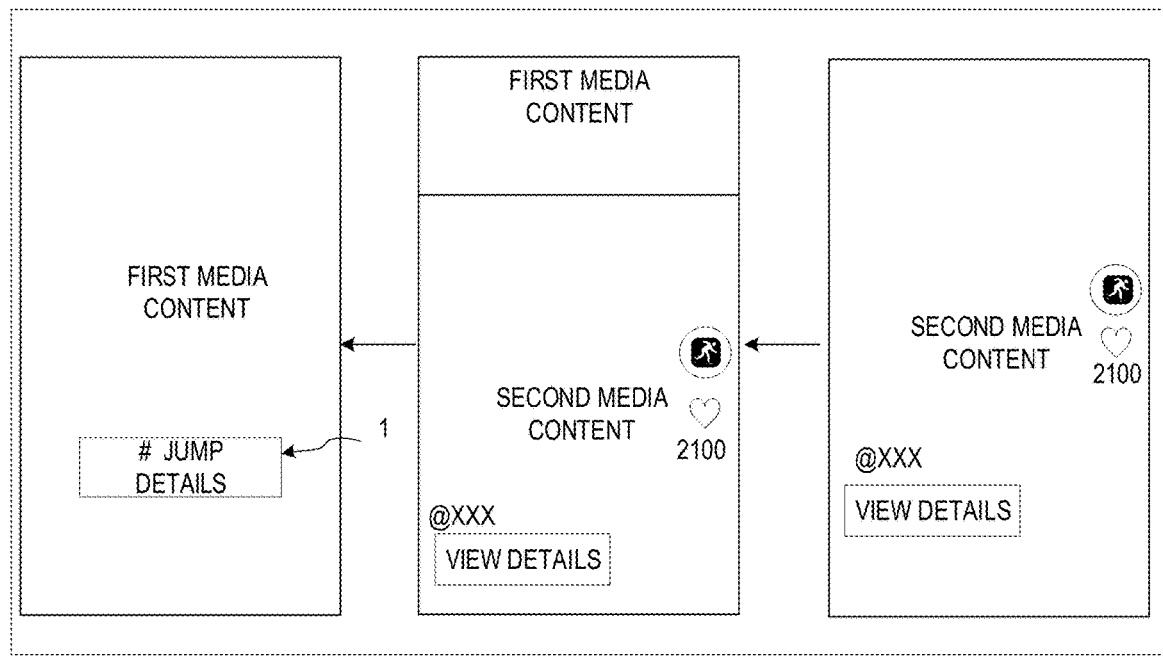
FIG. 5 is a schematic diagram of a method of interaction according to an embodiment of the present disclosure.
Figure 6:
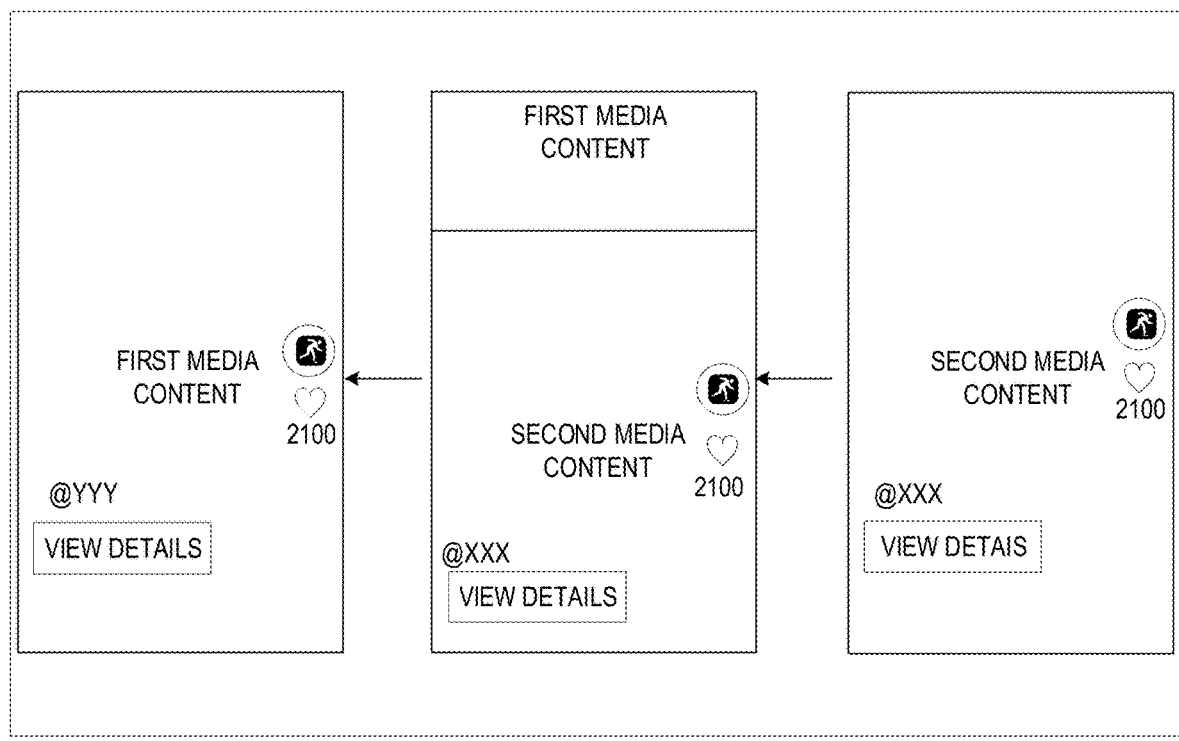
FIG. 6 is a schematic diagram of another method of interaction according to an embodiment of the present disclosure.

FIG. 5 is a schematic diagram of a method of interaction according to an embodiment of the present disclosure. If the user completes the interaction of sliding away and then sliding back to watch the topview advertisement within a predetermined time, the topview advertisement is still presented in the "topview style" when the user slides back to watch the topview advertisement. FIG. 6 is a schematic diagram of another method of interaction according to an embodiment of the present disclosure. If the duration of sliding back to watch the topview ad exceeds the predetermined duration, the topview advertisement is presented in an "ordinary video stream style" when the user slides back to watch the topview advertisement.

In an embodiment, the switching the currently displayed first media content to a second media content comprises:
switching the currently displayed first media content to the second media content, and displaying an interaction control for the second media content, wherein the interaction control for the second media content is configured to trigger an execution of an interaction event associated with the second media content.

It may be considered that, while switching the currently displayed first media content to the second media content, an interaction control for the second media content may be displayed to trigger an execution of the interaction event associated with the second media content. In addition, information of the second media content may also be displayed.

In an embodiment, the displaying the first media content on the topview page comprises:

displaying, on the topview page, the first media content and associated information of the first media content, wherein the associated information comprises at least one of the following: a picture and/or a copywriting.

The association information may refer to information associated with the first media content, for example, a picture and/or a copywriting associated with the first media content. For example, the information may include a picture and/or a copywriting associated with the target object recommended by the first media content, and the content of the association information may be set by the publisher of the first media content as needed. The location of the display of the association information is not limited.

In an embodiment, the associated information is displayed in a detail control of a target object recommended for the first media content, and the detail control is configured to trigger a display of the detail page of the target object.

The detail control is a control for triggering a display of the detail page of the target object. The detail page is an interface for describing the target object in detail, and the display size and the position of the detail control may be set according to the actual page condition. In this step, the association information of the first media content may be displayed within a detail control of the target object recommended for the first media content, configured to trigger the display of the detail page of the target object.

In an embodiment, at least two page identifications are further displayed on the topview page, and the at least two page identifications is configured to trigger a display of a page corresponding to the triggered page identification.

The page identification is configured to trigger a display of a page corresponding to the triggered page identification. For example, the page identification may include at least one of a page identification of a media content display page, a page identification of a media content creation page, and a page identification of an information presentation page. The page identification of the media content display page is configured to trigger the display of the media content display page, and the media content display page may include a predetermined media content display page, and may also include other media content display pages other than the predetermined media content display page, such as a following page, etc., and the following page may be a page configured to display media content published by a user who has been following the media content; the page identification of the media content creation page is configured to trigger the display of the media content creation page, which is configured to create a media content, such as capturing a media content, etc. At this time, the media content creation page may include a capturing page; the page identification of the information display page is configured to trigger the display of an information display page, which may be a page for presenting information, such as a friend list page, a message list page and/or the personal home page of the user.

Figure 7:
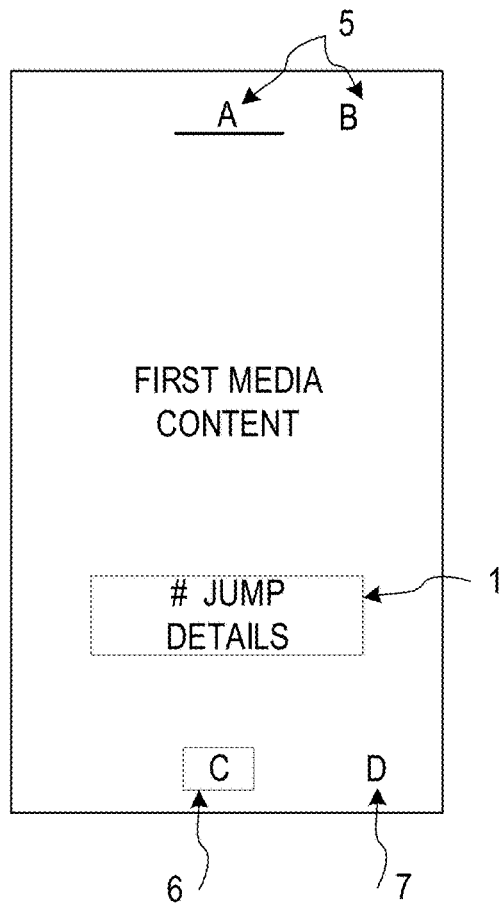
FIG. 7 is a schematic diagram of yet another topview page according to an embodiment of the present disclosure.

FIG. 7 is a schematic diagram of yet another topview page according to an embodiment of the present disclosure. As shown in FIG. 7, the first media content and Detail Control 1 are presented on the topview page, and a page identification is further presented on the topview page, including Page Identification 5 of the media content display page, Page Identification 6 of the media content creation page, and Page Identification 7 of the information display page, and the like.

Embodiments of the present disclosure provide the method of interaction that enable more configuration items to be supported for video stream advertisements, i.e., to support the publisher to perform copywriting configuration (including configuring the content and number of copywriting) and image configuration (i.e., configuring the images and/or copywriting included in the associated information).

Figure 8:
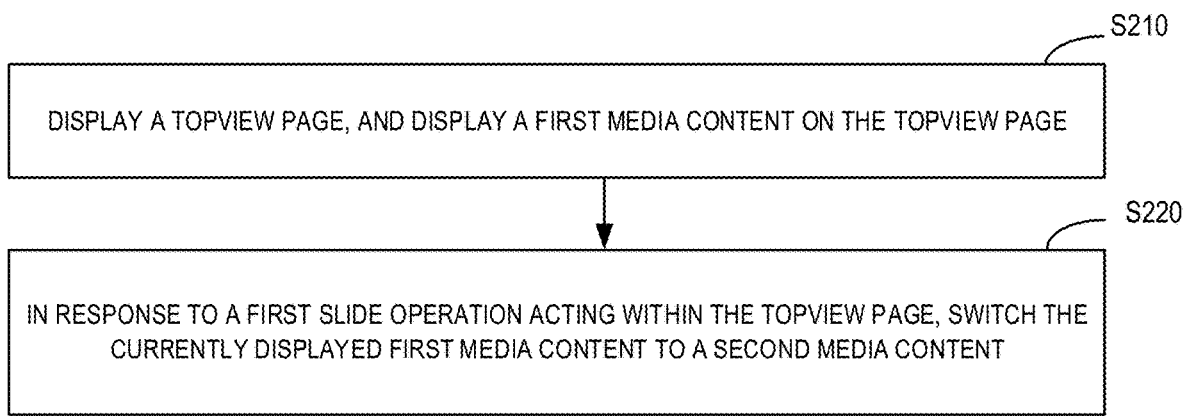
FIG. 8 is a schematic flowchart of another method of interaction according to an embodiment of the present disclosure.

FIG. 8 is a schematic flowchart of another method of interaction according to an embodiment of the present disclosure. The solution in this embodiment may be combined with one or more optional solutions in the foregoing embodiments. As shown in FIG. 8, a method of interaction provided by an embodiment of the present disclosure includes the following steps.

At S210, a topview page is displayed, and a first media content on the topview page is displayed.

At S220, in response to a first slide operation acting within the topview page, the currently displayed first media content is switched to a second media content.

When it is detected that the user performs the first slide operation within the topview page, the current media content on the topview page may be directly switched from the first media content to the second media content in response to the first slide operation acting on the topview page, to switch the current displayed content.

According to the method of interaction provided by the embodiment of the specification, the current media content is directly switched from the first media content to the second media content on the topview page in response to the first slide operation acting on the topview page. The user operation is facilitated, and meanwhile the consistency of the page during media content switching is improved.

In an embodiment, the method further comprises: after the switching the currently displayed first media content to a second media content.

in response to a second slide operation acting within the topview page, switching the current media content displayed on the topview page from the second media content to the first media content.

The second slide operation is similar to the first slide operation, which may refer to a behavior of performing a slide operation on the topview page, but the second slide operation is different from a manner of operation of the first slide operation (for example, a direction), to distinguish a direction of switching media content. For example, the first slide operation may be an upward slide operation, and the second slide operation may be a downward slide operation.

It may be considered that after switching the currently displayed first media content to the second media content, the user may review the first media content by performing the second slide operation within the topview page. Correspondingly, when receiving the second slide operation, the application may switch the current media content displayed on the topview page from the second media content to the first media content. On this basis, a non-blocking interaction is implemented on the topview page.

In an embodiment, after displaying the first media content on the topview page, the method further includes:

in response to the first media content being displayed to a predetermined node, adding a display of an interaction control for the first media content to the topview page, wherein the interaction control for the first media content is configured to trigger an execution of an interaction event associated with the first media content; or in response to the first media content being completely displayed, switching the current media content on the topview page from the first media content to a third media content, and displaying an interaction control for the third media content, wherein the interaction control for the third media content is configured to trigger an execution of an interaction event associated with the third media content.

The predetermined node may be a pre-set node, such as a node set according to a playing duration (e.g., 3 s), or a node set according to the playing content, or a node for the end of the display of the first media content, etc. The interaction control may be a control for triggering an execution of an interaction event, such as a like control, a comment control or a share control of the first media content/third media content, etc. By way of example, the interaction control for the first media content/third media content may be used to trigger an execution of an interaction event associated with the first media content/third media content, such as a like for the first media content/third media content, displaying a comment panel of the first media content/third media content for the user to comment on the first media content/third media content or displaying a sharing panel of the first media content/third media content for the user to share the first media content/third media content, etc. The third media content is used to distinguish the first media content, and in this embodiment, the third media content may be the same as or different from the second media content, and this embodiment does not limit this.

By way of example, in an implementation, when the first media content being displayed to a predetermined node, a display of an interaction control for the first media content can be added to the topview page to trigger the execution of the interaction event associated with the first media content; the information for displaying the first media content may also be added; and the display state of the detail control of the target object recommended for the first media content may be adjusted, for example, a display style and a display position.

In an implementation, when the first media content is displayed to a predetermined node, the topview page may be switched to the predetermined media content display page, the first media content continues to be displayed in the predetermined media content display page, and the display interaction control and the information of the first media content is added in the predetermined media content display page.

In the process of adjusting the display state of the detail control, the topview page can be switched to the predetermined media content display page to enhance the consistency of the frame displayed when the topview page is switched to the predetermined media content display page, and to avoid a situation in which the frame is switched too abruptly.

In an implementation, when the first media content being completely displayed, the current media content on the topview page is switched from the first media content to a third media content, and an interaction control for the third media content is displayed to trigger an execution of an interaction event associated with the third media content, Meanwhile, the information for displaying the third media content may also be added.

In addition, when the first media content is completely displayed, the first media content may also be cyclically played on the topview page, or the media content may be paused on the topview page.

The foregoing embodiments may be combined according to actual interaction situations.

Figure 9:
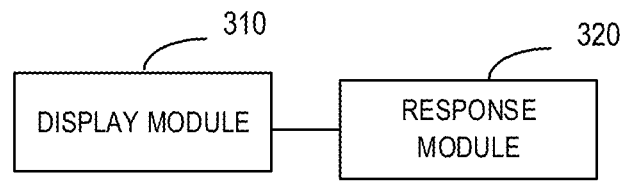
FIG. 9 is a schematic structural diagram of an apparatus for interaction according to an embodiment of the present disclosure.

FIG. 9 is a schematic structural diagram of an apparatus for interaction according to an embodiment of the present disclosure. The apparatus may be adapted for interaction on a topview page, wherein the apparatus may be implemented by software and/or hardware and generally integrated on an electronic device.

As shown in FIG. 9, the apparatus includes the following modules.

A display module 310 is configured to display a topview page, and display a first media content on the topview page; and A response module 320 is configured to, in response to a first slide operation acting within the topview page, switch the currently displayed first media content to a second media content.

The apparatus for interaction provided by the embodiment of the specification displays a topview page, and displays a first media content on the topview page through the display module 310; and in response to a first slide operation acting within the topview page, switches the currently displayed first media content to a second media content through the response module 320. The apparatus enables the user to directly switch the currently displayed first media content to the second media content by performing a first slide operation within the topview page, without the need to set a skip control in the topview page or to trigger the skip control displayed at a specific position in the topview page, which can reduce the difficulty of the operation of the user in skipping the first media content displayed in the topview page, and make the interaction operation more convenient, thus improving the user interaction experience.

The response module 320 is configured to:

switch a current media content on the topview page from the first media content to the second media content.

The apparatus for interaction provided in the embodiments of the present disclosure further includes:

a first switching module configured to, after the switching the currently displayed first media content to a second media content, in response to a second slide operation acting within the topview page, switch the current media content displayed on the topview page from the second media content to the first media content.

The apparatus for interaction provided in the embodiments of the present disclosure further includes:

a first display module configured to, after displaying the first media content on the topview page, in response to the first media content being displayed to a predetermined node, add a display of an interaction control for the first media content to the topview page, wherein the interaction control for the first media content is configured to trigger an execution of an interaction event associated with the first media content; or a second display module configured to, after displaying the first media content on the topview page, in response to the first media content being completely displayed, switch the current media content on the topview page from the first media content to a third media content, and display an interaction control for the third media content, wherein the interaction control for the third media content is configured to trigger an execution of an interaction event associated with the third media content.

The response module 320 is configured to:

switch a current page from the topview page to a predetermined media content display page, and displaying the second media content on the predetermined media content display page.

The apparatus for interaction provided in the embodiments of the present disclosure further includes:

a second switching module configured to, after the switching the currently displayed first media content to a second media content, in response to a third slide operation acting within the predetermined media content display page, switch a current media content displayed on the predetermined media content display page from the second media content to the first media content; or a third switching module configured to, after the switching the currently displayed first media content to a second media content, in response to a fourth slide operation acting within the predetermined media content display page, switch a current page from the predetermined media content display page to the topview page, and displaying the first media content on the topview page.

The response module 320 is configured to:

switch the currently displayed first media content to the second media content, and display an interaction control for the second media content, wherein the interaction control for the second media content is configured to trigger an execution of an interaction event associated with the second media content.

The display module 310 is configured to:

display, on the topview page, the first media content and associated information of the first media content, wherein the associated information comprises at least one of the following: a picture and/or a copywriting.

The associated information is displayed in a detail control of a target object recommended for the first media content, and the detail control is configured to trigger a display of the detail page of the target object.

At least two page identifications are further displayed on the topview page, and the at least two page identifications are configured to trigger a display of a page corresponding to the triggered page identification.

The at least two page identifications comprise at least one of a page identification of a media content display page, a page identification of a media content creation page, and a page identification of an information presentation page.

The apparatus for interaction may perform the method of interaction provided by any embodiment of the present disclosure and has a corresponding function module and effect of the execution method.

Figure 10:
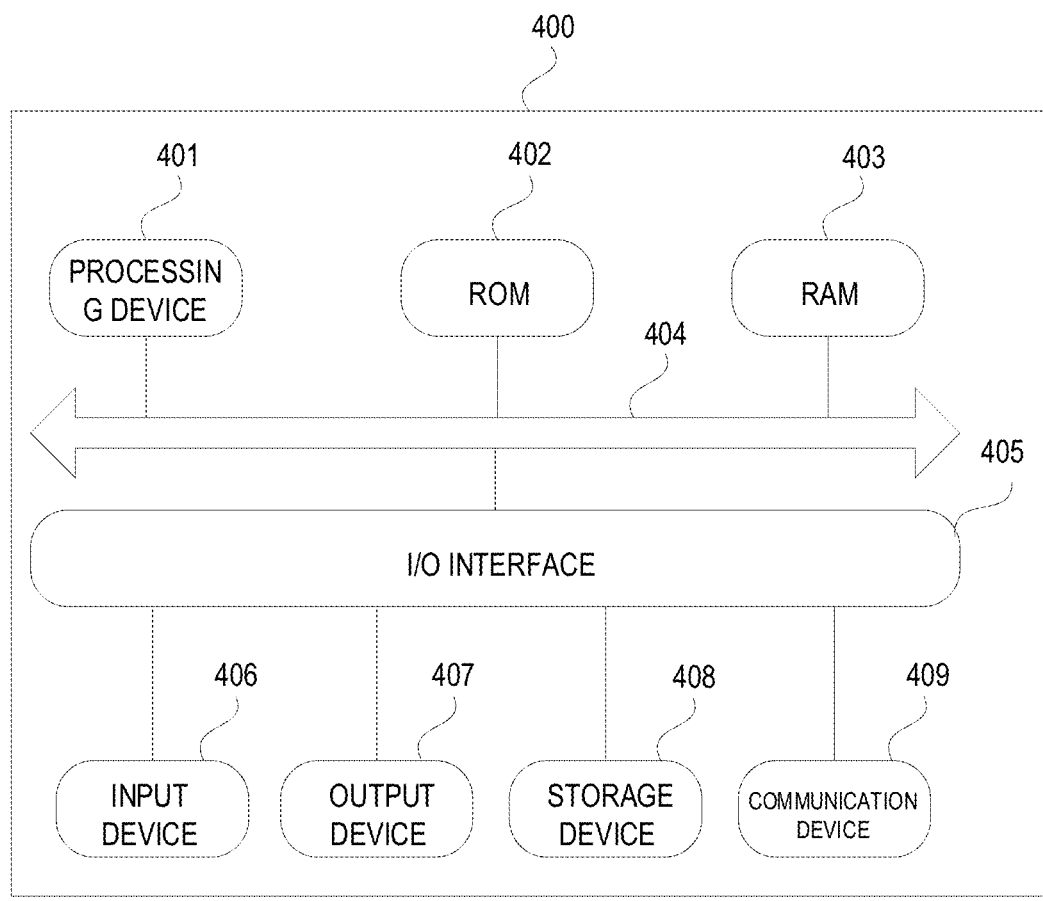
FIG. 10 is a schematic structural diagram of an electronic device according to an embodiment of the present disclosure.

FIG. 10 is a schematic structural diagram of an electronic device 400 suitable for implementing embodiments of the present disclosure. The terminal device in the embodiments of the present disclosure may include a mobile terminal such as a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), and a fixed terminal such as a digital television (TV), a desktop computer, or the like. The electronic device shown in FIG. 10 is merely an example and should not impose any limitation on the functions and scope of use of the embodiments of the present disclosure.

As shown in FIG. 10, the electronic device 400 may include a processing device (for example, a central processing unit, a graphics processor, etc.) 401, and the processing device 401 may perform various appropriate actions and processing according to a program stored in a read-only memory (ROM) 402 or a program loaded into a random access memory (RAM) 403 from a storage device 408. In the RAM 403, various programs and data required by the operation of the electronic device 400 are also stored. The processing device 401, the ROM 402, and the RAM 403 are connected to each other through a bus 404. An input/output (I/O) interface 405 is also connected to the bus 404.

The following devices may be connected to the I/O interface 405: an input device 406 including, for example, a touch screen, a touch pad, a keyboard, a mouse, a camera, a microphone, an accelerometer, a gyroscope, etc.; an output device 407 including, for example, a liquid crystal display (LCD), a speaker, a vibrator, etc.; a storage device 408 including, for example, a magnetic tape, a hard disk, etc.; and a communication device 409. The communication device 409 may allow the electronic device 400 to communicate wirelessly or wired with other devices to exchange data. Although FIG. 10 illustrates an electronic device 400 having a variety of devices, it is not required to implement or have all illustrated devices. More or fewer devices may alternatively be implemented or provided.

According to an embodiment of the present disclosure, the process described above with reference to the flowchart may be implemented as a computer software program. For example, embodiments of the present disclosure include a computer program product comprising a computer program embodied on a non-transitory computer readable medium, the computer program comprising program code for performing the method shown in the flowchart. In such embodiments, the computer program may be downloaded and installed from the network through the communication device 409, or installed from the storage device 408, or from the ROM 402. When the computer program is executed by the processing apparatus 401, the foregoing functions defined in the method of the embodiments of the present disclosure are performed.

The computer readable medium described above may be a computer readable signal medium or a computer readable storage medium or any combination of the two. The computer-readable storage medium may, be, for example, an electrical, magnetic, optical, electromagnetic, infrared, or semiconductor system, device, or device, or any combination thereof. The computer-readable storage medium may include: an electrical connection having one or more wires, a portable computer diskette, a hard disk, a RAM, a ROM, an erasable programmable read-only memory (EPROM), a flash memory, an optical fiber, a portable compact disk read-only memory (CD-ROM), an optical storage device, a magnetic storage device, or any suitable combination thereof. In the present disclosure, a computer-readable storage medium may be any tangible medium containing or storing a program that may be used by or in connection with an instruction execution system, apparatus, or device. In the present disclosure, a computer readable signal medium may include a data signal propagated in baseband or as part of a carrier, where the computer readable program code is carried. Such propagated data signals may take a variety of forms, including electromagnetic signals, optical signals, or any suitable combination of the foregoing. The computer readable signal medium may also be any computer readable medium other than a computer readable storage medium that may send, propagate, or transmit a program for use by or in connection with an instruction execution system, apparatus, or device. The program code embodied on the computer-readable medium may be transmitted by any suitable medium, including wires, optical cables. Radio Frequency (RF), and the like, or any suitable combination thereof.

In some implementations, the client, server may communicate using any currently known or future developed network protocol, such as Hypertext Transfer Protocol (HTTP), and may be interconnected with any form or medium of digital data communication (e.g., a communication network). Examples of communication networks include Local Area Networks (LANs). Wide Area Networks (WANs), Internet networks (e.g., the Internet), and peer-to-peer networks (e.g., ad hoc peer-to-peer networks), as well as any currently known or future developed networks.

The computer-readable medium described above may be included in the electronic device; or may be separately present without being assembled into the electronic device.

The computer readable medium carries one or more programs, and when the one or more programs are executed by the electronic device, the electronic device is caused to: display a topview page, and display a first media content on the topview page; and in response to a first slide operation acting within the topview page, switch the currently displayed first media content to a second media content.

Computer program code for performing the operations of the present disclosure may be written in one or more programming languages, including object-oriented programming languages, such as Java, Smalltalk, C++, and conventional procedural programming languages, such as the "C" language or similar programming languages. The program code may execute entirely on a user computer, partially on a user computer, as a stand-alone software package, partially on a user computer, partially on a remote computer, or entirely on a remote computer or server. In the case of a remote computer, the remote computer may be connected to the user computer through any kind of network, including a LAN or WAN, or may be connected to an external computer (e.g., connected through the Internet using an Internet service provider).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that includes one or more executable instructions for implementing the specified logical function. In some alternative implementations, the functions noted in the blocks may also occur in a different order than noted in the figures. For example, two consecutively represented blocks may actually be performed substantially in parallel, which may sometimes be performed in the reverse order, depending on the functionality involved. Each block in the block diagrams and/or flowcharts, as well as combinations of blocks in the block diagrams and/or flowcharts, may be implemented with a dedicated hardware-based system that performs specified functions or operations, or may be implemented in a combination of dedicated hardware and computer instructions.

The units involved in the embodiments of the present disclosure may be implemented in software or may be implemented in hardware. The name of the module does not constitute a limitation on the unit itself in one case.

The functions described above may be performed, at least in part, by one or more hardware logic components. For example, the example types of hardware logic components that may be used include: a field programmable gate array (FPGA), an application specific integrated circuit (ASIC), an application specific standard (ASSP), a system on chip (SOC), a complex programmable logic device (CPLD), and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include electronic, magnetic, optical, electromagnetic, infrared, or semiconductor systems, devices, or devices, or any suitable combination of the foregoing. The machine-readable storage medium includes an electrical connection based on one or more lines, a portable computer disk, a hard disk, a RAM, a ROM, an EPROM, a flash memory; an optical fiber, a portable CD-ROM, an optical storage device, a magnetic storage device, or any suitable combination of the foregoing. The storage medium may be a non-transitory storage medium.

According to one or more embodiments of the present disclosure, example 1 provides a method of interaction, comprising:

displaying a topview page, and displaying a first media content on the topview page; and in response to a first slide operation acting within the topview page, switching the currently displayed first media content to a second media content.

According to one or more embodiments of the present disclosure, example 2 is according to the method described in example 1, the switching the currently displayed first media content to a second media content comprising:

switching a current media content on the topview page from the first media content to the second media content.

According to one or more embodiments of the present disclosure, example 3 is according to the method described in example 2, and the method further comprises: after the switching the currently displayed first media content to a second media content, in response to a second slide operation acting within the topview page, switching the current media content displayed on the topview page from the second media content to the first media content.

According to one or more embodiments of the present disclosure, example 4 is according to the method described in example 2, after displaying the first media content on the topview page, further comprising:

in response to the first media content being displayed to a predetermined node, adding a display of an interaction control for the first media content to the topview page, wherein the interaction control for the first media content is configured to trigger an execution of an interaction event associated with the first media content; or in response to the first media content being completely displayed, switching the current media content on the topview page from the first media content to a third media content, and displaying an interaction control for the third media content, wherein the interaction control for the third media content is configured to trigger an execution of an interaction event associated with the third media content.

According to one or more embodiments of the present disclosure, example 5 is according to the method described in example 1, the switching the currently displayed first media content to a second media content comprising:

switching a current page from the topview page to a predetermined media content display page, and displaying the second media content on the predetermined media content display page.

According to one or more embodiments of the present disclosure, example 6 is according to the method described in example 1, the method further comprises: after the switching the currently displayed first media content to a second media content, in response to a third slide operation acting within the predetermined media content display page, switching a current media content displayed on the predetermined media content display page from the second media content to the first media content; or in response to a fourth slide operation acting within the predetermined media content display page, switching a current page from the predetermined media content display page to the topview page, and displaying the first media content on the topview page.

According to one or more embodiments of the present disclosure, example 7 is according to the method described in example 1, the switching the currently displayed first media content to a second media content comprising:

switching the currently displayed first media content to the second media content, and displaying an interaction control for the second media content, wherein the interaction control for the second media content is configured to trigger an execution of an interaction event associated with the second media content.

According to one or more embodiments of the present disclosure, example 8 is according to any of the method described in example 1-7, the displaying the first media content on the topview page comprises:

displaying, on the topview page, the first media content and associated information of the first media content, wherein the associated information comprises at least one of the following: a picture or a copywriting.

According to one or more embodiments of the present disclosure, example 9 is according to the method described in example 8, wherein the associated information is displayed in a detail control of a target object recommended for the first media content, and the detail control is configured to trigger a display of the detail page of the target object.

According to one or more embodiments of the present disclosure, example 10 is according to any of the method described in example 1-7, wherein at least two page identifications are further displayed on the topview page, and the at least two page identifications is configured to trigger a display of a page corresponding to the triggered page identification.

According to one or more embodiments of the present disclosure, example 11 is according to the method described in example 10, wherein the at least two page identifications comprise at least one of a page identification of a media content display page, a page identification of a media content creation page, and a page identification of an information presentation page.

According to one or more embodiments of the present disclosure, an apparatus for interaction is provided by example 12, comprising:

a display module configured to display a topview page, and display a first media content on the topview page; and a response module configured to, in response to a first slide operation acting within the topview page, switch the currently displayed first media content to a second media content.

According to one or more embodiments of the present disclosure, an electronic device is provided by example 13, comprising:

at least one processor; and a memory communicatively connected to the at least one processor, wherein the memory has a computer program executable by the at least one processor stored thereon, the computer program is executed by the at least one processor to enable the at least one processor to perform the method of interaction of any of examples 1-11.

According to one or more embodiments of the present disclosure, a computer-readable storage medium is provided by an example 14, wherein the computer-readable storage medium has computer instructions stored thereon, the computer instructions is configured to cause the processor, when executed, to implement the method of interaction of any of examples 1-11.

Further, while multiple operations are depicted in a particular order, this should not be understood to require that these operations be performed in the particular order shown or in sequential order. In certain circumstances, multitasking and parallel processing may be advantageous. Likewise, while multiple implementation details are included in the discussion above, these should not be construed as limiting the scope of the present disclosure. Some features described in the context of separate embodiments may also be implemented in combination in a single embodiment. Conversely, the various features described in the context of a single embodiment may also be implemented in multiple embodiments either individually or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

The invention claimed is:

1. A method of interaction, comprising:
   displaying a topview page, and displaying a first media content and at least two page identifications on the topview page, wherein the at least two page identifications is configured to trigger a display of a page corresponding to a triggered page identification, and wherein the at least two page identifications comprise at least one of a page identification of a media content display page, a page identification of a media content creation page, or a page identification of an information presentation page; and
   in response to a first slide operation acting within the topview page, switching the currently displayed first media content to a second media content.

2. The method of claim 1, wherein the switching the currently displayed first media content to the second media content comprises:
   switching a current media content on the topview page from the first media content to the second media content.

3. The method of claim 2, wherein the method further comprises:
   after switching the currently displayed first media content to the second media content,
   in response to a second slide operation acting within the topview page, switching the current media content displayed on the topview page from the second media content to the first media content.

4. The method of claim 2, after displaying the first media content on the topview page, further comprises at least one of the following:
   in response to the first media content being displayed to a predetermined node, adding a display of an interaction control for the first media content to the topview page, wherein the interaction control for the first media content is configured to trigger an execution of an interaction event associated with the first media content; or
   in response to the first media content being completely displayed, switching the current media content on the topview page from the first media content to a third media content, and displaying an interaction control for the third media content, wherein the interaction control for the third media content is configured to trigger an execution of an interaction event associated with the third media content.

5. The method of claim 1, wherein switching the currently displayed first media content to the second media content comprises:
   switching a current page from the topview page to a predetermined media content display page, and displaying the second media content on the predetermined media content display page.

6. The method of claim 5, wherein the method further comprises:
   after switching the currently displayed first media content to the second media content,
   in response to a third slide operation acting within the predetermined media content display page, switching a current media content displayed on the predetermined media content display page from the second media content to the first media content; or
   in response to a fourth slide operation acting within the predetermined media content display page, switching the current page from the predetermined media content display page to the topview page, and displaying the first media content on the topview page.

7. The method of claim 1, wherein switching the currently displayed first media content to the second media content comprises:
   switching the currently displayed first media content to the second media content, and displaying an interaction control for the second media content, wherein the interaction control for the second media content is configured to trigger an execution of an interaction event associated with the second media content.

8. The method of claim 1, wherein displaying the first media content on the topview page comprises:
   displaying, on the topview page, the first media content and associated information of the first media content, wherein the associated information comprises at least one of the following: a picture or a copywriting.

9. The method of claim 8, wherein the associated information is displayed in a detail control of a target object recommended for the first media content, and the detail control is configured to trigger a display of a detail page of the target object.

10. An electronic device, comprising:
    at least one processor; and
    a memory communicatively connected to the at least one processor,
    wherein the memory has a computer program executable by the at least one processor stored thereon, the computer program is executed by the at least one processor to enable the at least one processor to perform at least:
    displaying a topview page, and displaying a first media content and at least two page identifications on the topview page, wherein the at least two page identifications is configured to trigger a display of a page corresponding to a triggered page identification, and wherein the at least two page identifications comprise at least one of a page identification of a media content display page, a page identification of a media content creation page, or a page identification of an information presentation page; and in response to a first slide operation acting within the topview page, switching the currently displayed first media content to a second media content.

11. The electronic device of claim 10, wherein switching the currently displayed first media content to the second media content comprises:

switching a current media content on the topview page from the first media content to the second media content.

12. The electronic device of claim 11, wherein the electronic device is further caused to perform:

after switching the currently displayed first media content to the second media content, in response to a second slide operation acting within the topview page, switching the current media content displayed on the topview page from the second media content to the first media content.

13. The electronic device of claim 11, wherein after displaying the first media content on the topview page, the electronic device is further caused to perform comprises at least one of:

in response to the first media content being displayed to a predetermined node, adding a display of an interaction control for the first media content to the topview page, wherein the interaction control for the first media content is configured to trigger an execution of an interaction event associated with the first media content; or in response to the first media content being completely displayed, switching the current media content on the topview page from the first media content to a third media content, and displaying an interaction control for the third media content, wherein the interaction control for the third media content is configured to trigger an execution of an interaction event associated with the third media content.

14. The electronic device of claim 10, wherein switching the currently displayed first media content to the second media content comprises:

switching a current page from the topview page to a predetermined media content display page, and displaying the second media content on the predetermined media content display page.

15. The electronic device of claim 14, wherein the electronic device is further caused to perform:

after switching the currently displayed first media content to a second media content, in response to a third slide operation acting within the predetermined media content display page, switching the current media content displayed on the predetermined media content display page from the second media content to the first media content; or in response to a fourth slide operation acting within the predetermined media content display page, switching a current page from the predetermined media content display page to the topview page, and displaying the first media content on the topview page.

16. The electronic device of claim 10, wherein switching the currently displayed first media content to the second media content comprises:

switching the currently displayed first media content to the second media content, and displaying an interaction control for the second media content, wherein the interaction control for the second media content is configured to trigger an execution of an interaction event associated with the second media content.

17. The electronic device of claim 10, wherein displaying the first media content on the topview page comprises:

displaying, on the topview page, the first media content and associated information of the first media content, wherein the associated information comprises at least one of the following: a picture or a copywriting.

18. A non-transitory computer-readable storage medium, wherein the computer-readable storage medium has computer instructions stored thereon, and the computer instructions are configured to cause a processor, when executed, to implement at least:

displaying a topview page, and displaying a first media content and at least two page identifications on the topview page, wherein the at least two page identifications is configured to trigger a display of a page corresponding to a triggered page identification, and wherein the at least two page identifications comprise at least one of a page identification of a media content display page, a page identification of a media content creation page, or a page identification of an information presentation page; and in response to a first slide operation acting within the topview page, switching the currently displayed first media content to a second media content.

19. The medium of claim 18, wherein switching the currently displayed first media content to the second media content comprises:

switching a current media content on the topview page from the first media content to the second media content.

20. The medium of claim 19, wherein the processor is further caused to perform:

after switching the currently displayed first media content to the second media content, in response to a second slide operation acting within the topview page, switching the current media content displayed on the topview page from the second media content to the first media content.

* * * * *